(12) United States Patent
Duncan et al.

(10) Patent No.: US 7,685,370 B1
(45) Date of Patent: Mar. 23, 2010

(54) DATA SYNCHRONIZATION WITH MULTIPLE PRODUCERS

(75) Inventors: Samuel Hammond Duncan, Arlington, MA (US); Lincoln G. Garlick, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 204 days.

(21) Appl. No.: 11/305,781

(22) Filed: Dec. 16, 2005

(51) Int. Cl.
*G06F 12/00* (2006.01)

(52) U.S. Cl. .................. 711/135; 711/147; 709/201; 712/28

(58) Field of Classification Search .................. 711/135
See application file for complete search history.

(56) References Cited

U.S. PATENT DOCUMENTS

| | | | | |
|---|---|---|---|---|
| 5,948,081 A | * | 9/1999 | Foster | 710/40 |
| 6,360,231 B1 | * | 3/2002 | Pong et al. | 707/201 |
| 6,678,798 B1 | * | 1/2004 | Kuskin et al. | 711/141 |
| 6,874,065 B1 | * | 3/2005 | Pong et al. | 711/135 |
| 2004/0208066 A1 | * | 10/2004 | Burky et al. | 365/200 |

* cited by examiner

Primary Examiner—Christian P Chace
Assistant Examiner—Matthew Bradley
(74) Attorney, Agent, or Firm—Townsend and Townsend and Crew LLP (57) ABSTRACT

A data processing system can establish or maintain data coherency by issuing a data flush operation. An agent can initialize a first flush operation by writing to a flush register. The agent can determine that the flush operation is complete by reading a status indicator from a status register. Additional agents can independently issue flush operations during the pendency of the first flush operation. A second flush instruction and any additional flush instructions that issue during the pendency of the first flush operation set a flush pending indicator in a status register. Once the first flush operation completes, the host performs all pending flush operations in a single second flush operation. The status indicator does not indicate a completed flush operation for the first flush operation until all flush operations are complete. Multiple co-pending flush operations are collapsed into at most two flush operations.

20 Claims, 4 Drawing Sheets

DATA SYNCHRONIZATION WITH MULTIPLE PRODUCERS

BACKGROUND

Data processing systems having multiple storage devices and memory partitions can have the ability to concurrently execute multiple independent processes. A controller can dynamically allocate portions of memory to each individual process. The controller can allocate and release the memory as required by the processes. Because processing of data for the various independent processes can occur in a distributed manner and utilize many logical memory blocks, the system needs a manner in which the data can be made coherent or otherwise consistent across the various frames of reference in the processing system.

One way in which the data can be made coherent is to allow each individual process to independently flush all memory locations. During a flush operation, all processes can be made to stall while the flush completes. Additionally, the processing system may limit the ability to initiate flush operations by locking access to the flush mechanism once one process takes control of it.

Interlocking of the flush mechanism is an inefficient manner of ensuring data coherency, multiple processes can be stalled unnecessarily while waiting for their turn to access the flush mechanism. Serially initiating an independent flush mechanism for each independent process can also produce a large latency for each flush.

As data processing systems become more complex, the need to maintain data coherency across multiple independent processes will become an increasingly common situation. Each of the multiple independent processes appear as an independent launcher of a data coherency mechanism.

BRIEF SUMMARY

A data processing system can establish or maintain data coherency by issuing a data flush operation, also referred to as a barrier or memory barrier. The flush operation can be used to ensure that data written prior to the flush operation remains or becomes consistent or otherwise coherent for all frames of reference following the flush operation. An agent can initialize a first flush operation by writing to a flush register. The agent can determine that the flush operation is complete by reading a status indicator from a status register. Additional agents can independently issue flush operations during the pendency of the first flush operation, where pendency refers to the duration following the initiation of the flush operation but before completion. A second flush instruction and any additional flush instructions that issue during the pendency of the first flush operation set a flush pending indicator in a status register. Once the first flush operation completes, the host performs all pending flush operations in a single second flush operation. The status indicator does not indicate a completed flush operation for the first flush operation until all flush operations are complete. Multiple co-pending flush operations are collapsed into at most two flush operations.

An aspect of the invention includes a method of processing multiple independent flush requests from independent processes using shared memory. The method includes receiving a first memory flush request, setting a pending status identifier, initiating a first flush operation, receiving at least one additional memory flush request during the pendency of the first memory flush request, combining the at least one additional memory flush request into a single outstanding flush request, completing the first flush operation, and initiating an outstanding flush operation corresponding to the single outstanding flush request.

An aspect of the invention includes a method of processing multiple independent flush requests from independent processes using shared memory. The method includes receiving a first memory flush request, initiating a first flush operation, determining receipt of additional memory flush requests during a pendency of the first flush operation, combining the additional memory flush requests into a single queued outstanding flush, completing the first flush operation, initiating a second flush operation in response to the single queued outstanding flush, and indicating a flush operation completion upon completion of the second flush operation.

An aspect of the invention includes a system for ensuring data coherency in the presence of multiple independent processes that includes a flush register configured to receive a first flush request from a first of the multiple independent processes and at least one additional flush request from at least one additional process from the independent processes, and a processor configured to initiate a first flush operation in response to the first flush request and further configured to combine the at least one additional flush request into an outstanding flush request if the at least one additional flush request is received during a pendency of the first flush operation.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

A data processing system can implement a plurality of data storage devices distributed across one or more devices. The system can be configured to dynamically allocate memory in each of the plurality of storage devices. The system can be configured to execute a plurality of independent processes and can allocate memory from each of the storage devices for each of the independent processes. Thus, each storage device can have portions of memory allocated to different processes.

The system can use a logical memory map to track the dynamic allocation and release of memory from each of the storage devices. The system can update the logical memory map as storage is allocated or released from a process. The system can process the data for each of the independent processes using a distributed architecture, where independent processors can concurrently operate on different sub-processes or different portions of the same process.

Each of the processors in a distributed architecture can implement a pipelined structure that can load numerous instructions into a pipeline for execution. Some of the sub-processes may allow for instruction execution in an optimized manner that is not limited to the order in which the instructions are presented to the processor.

Therefore, the system may concurrently execute multiple independent processes, each of which may be distributed across multiple processors using pipelined or otherwise optimized instruction scheduling. The system needs to ensure that the data is coherent or otherwise consistent for all frames of reference in some instances. For example, the system may ensure data coherency before updating the logical memory map. The system needs to ensure that pending writes to memory are complete before initiating the update. The system can implement a data flush mechanism, also referred to as a barrier or memory barrier, to ensure that all frames of reference for data are coherent or otherwise consistent.

Because the system can concurrently execute multiple independent processes, each process typically has no ability to predict when another process will initiate a data flush operation. Indeed, multiple processes may independently attempt to initiate a flush operation during the pendency of a previously issued flush operation.

The system can implement a flush mechanism that allows for multiple flush operations to be executed substantially concurrently. The system can implement a status register that indicates the status of any flush operations. The status indicator can indicate whether any flush operations are pending and whether any flush operations are outstanding. An outstanding flush operation refers to a flush operation that is initiated after the issuance of the pending flush operation.

The system can collapse the operation of all flush operations that are initiated during the pendency of a first flush operation. Thus, the system is limited to a maximum of one outstanding flush operation regardless of the number of flush operations that are initiated during the pendency of a flush operation.

The outstanding status indicator is cleared once the first flush operation completes. The pending status indicator remains valid to indicate the execution of the flush operations that are collapsed into a single flush operation. The second flush operation satisfies all flush operations that initiate during the pendency of the first flush operation. Once the second flush operation completes, the pending status indicator can be cleared, indicating completion of the flush operation. At this point, all memory will be coherent from all frames of reference.

Each process initiating a flush operation can read, monitor, or otherwise poll the pending status indicator to determine when the flush operation is complete. Collapsing multiple flush operations received during the pendency of a flush operation allows flush operations to be initiated regardless of the status of any independently initiated flush operation. Additionally, the system processes multiple independent flush operations more efficiently than sequentially executing each of a plurality of flush operations initiated by independent processes.

Figure 1:
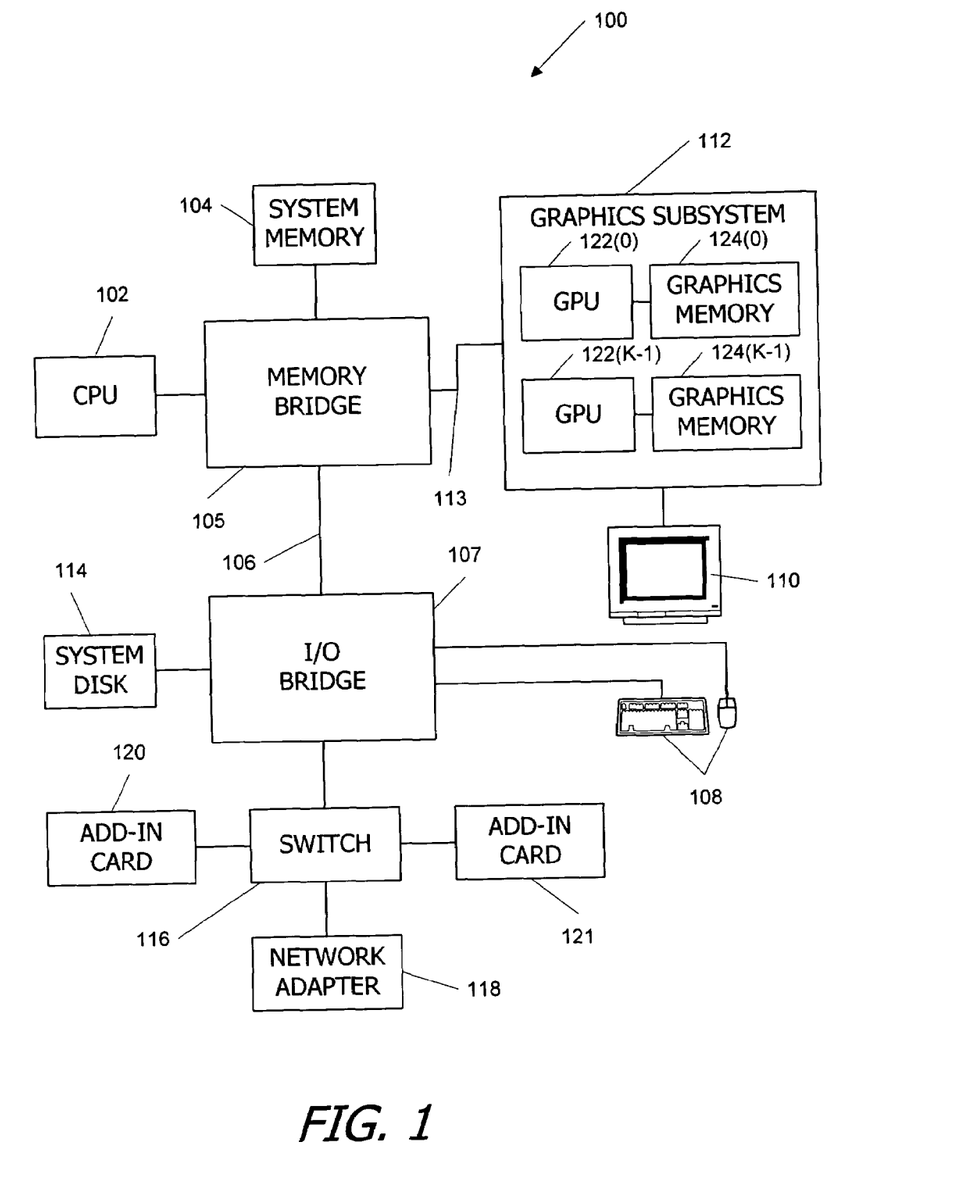
FIG. 1 is a simplified functional block diagram of an embodiment of a computer system.

FIG. 1 is a block diagram of a computer system 100 according to an embodiment of the invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a CRT or LCD based monitor) operating under control of a graphics subsystem 112 coupled to memory bridge 105 via a bus 113. A system disk 114 is also connected to I/O bridge 107. A bus or switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics processing subsystem 112 includes at least one graphics processing unit (GPU) 122 and associated graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 can also include a scanout module configured to deliver pixel data from graphics memory 124 to display device 110.

As shown in FIG. 1, the graphics processing subsystem 112 can include a plurality of K GPUs 122(0)-122(K−1). Each of the K GPUs 122(0)-122(K−1) can have associated graphics memory 124(0)-124(K−1). The graphics subsystem 112 can be implemented on a single graphics assembly coupled via the bus 113 to the memory bridge 105. Alternatively, the graphics subsystem 112 can be implemented on a plurality of distinct assemblies. For example, the graphics subsystem 112 can include two separate graphics cards. Each graphics card can include a GPU 122 and associated graphics memory 124. Each of the graphics cards can couple to the memory bridge 105 via the bus 113. The bus 113 can be a bus utilizing the PCI or PCI-E communication protocol or some other communications protocol.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102.

The CPU 102 can be configured to concurrently execute a plurality of independent processes, each of which can share use of the system memory 104 and graphics subsystem 112. For example, the system memory 104 can store executable code or software for a plurality of independent processes, and the CPU 102 can concurrently access the system memory 104 to retrieve and execute the independent processes.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107. A GPU may be provided with any amount of local graphics memory, including no local memory, and may use local memory and system memory in any combination.

As described above, any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the invention may be incorporated into a variety of devices, including general purpose computer systems, video game consoles and other special purpose computer systems, DVD players, handheld devices such as mobile phones or personal digital assistants, and so on.

As described above, the CPU 102 can be configured to concurrently execute a plurality of independent processes, each of which can use portions of system memory 104 and graphics memory 124. Each of the add-in cards 120, 121 can also execute a process, in conjunction or independent of the CPU 102, that uses a portion of system memory 104 or graphics memory 124.

Each of the independent processes can initiate a flush operation independent of any flush operation initiated by any other process. Software can be responsible for initiating and monitoring the flush operation when the flush operation is a related to resource management, such as updating a page table entry of a logical memory map or managing display resources.

To initiate a flush operation, the CPU 102 can write to a flush register in a GPU 122. In one embodiment, the flush register can include a plurality of fields and each of the fields can correspond to a memory or memory partition. If the flush register includes a plurality of fields, the CPU 102 can selectively flush a subset of the memory or memory partitions. In another embodiment, any flush operation will result in a flush of all portions of memory, and there is no ability to selectively exclude portions of memory from the flush operation.

The GPU 122 can update a status register once the flush register is written. The status register can include a field, such as a bit, that indicates that a flush operation is pending. The GPU 122 can set the pending bit in the status register and can initiate the flush operation.

The GPU 122 can be configured to perform a flush by initiating a read operation of at least one location each memory partition of the graphics memory 124 associated with the GPU 122. The GPU 122 can selectively initiate a read of system memory 104 and graphics memory 124 associated with any peer GPUs 122. The term "peer GPU" refers to GPU 122 and graphics memory 124 distinct from the GPU 122 and associated graphics memory 124 initiating the flush operation. In one embodiment, the GPU 122 can be configured to read from system memory 104 and the graphics memory 124 of a peer GPU 122 only if a write to that memory occurred since execution of the last flush operation.

The system 100 can be configured to complete all write operations prior to servicing a later issued read operation. Thus, the system 100 can be assured of having completed all write operations to a particular memory portion when a read from that portion of memory returns a value. The flush operation has completed when all of the reads initiated by the flush operation complete.

The GPU 122 can clear the pending field of the status register once the flush has completed. The software process initiating the flush operation can monitor the pending field of the status register to determine that the flush operation is complete. In one embodiment, the software process can poll or otherwise monitor the status register to determine when the pending status clears.

Additional software processes can initiate a flush operations independent of flush operations initiated by any of the other independent processes. Each of the multiple independent processes can initiate a flush operation by writing to the flush register independent of the status or timing of any pending or outstanding flush operations initiated by any other process.

If a process initiates a flush operation during the period that an earlier flush operation is pending, the GPU 122 updates a flush outstanding field, such as an outstanding bit, in the status register. The presence of the outstanding bit indicates that a flush operation was pending when another process initiated a subsequent flush operation.

The GPU 122 maintains the status of the outstanding status indicator until the pending flush operation completes. When the pending flush operation completes, the GPU clears the outstanding status indicator and maintains the pending status indicator. The completion of the earlier issued flush operation does not result in clearing of the pending status bit. Thus, the GPU 122 continues to indicate that a flush operation is pending. The GPU 122 continues with the flush operation initiated as a result of the one or more outstanding flushes. Once the later pending flush completes, the pending bit is cleared and the status register indicates completion of the flush operation.

All flush operations that initiate during the period that a flush is outstanding can be collapsed or otherwise combined into the outstanding flush operation. Thus, writes to the flush register during the pendency of the flush merely set the outstanding status indicator. Regardless of the number of independent processes initiating a flush operation during a pending flush operation, the GPU 122 only needs to identify that an outstanding flush exists. Thus, the outstanding status indicator behaves substantially as an indicator of an idempotent flush operation initiator. Regardless of the number of additional writes to the flush register, the GPU 122 needs only to track the presence of a single outstanding flush operation. All of the flushes can be combined into the single outstanding flush operation.

In those embodiments in which writes to the flush register initiate a flush of all memory locations, all writes to the flush register occurring during the pendency of a prior initiated flush operation set the outstanding indicator. In the embodiments in which the write to the flush register can include fields indicating the particular portions of memory to flush, all writes to the flush register received during the pendency of a flush operation can be logically ORed to combine or otherwise collapse all of the flush operations into a single outstanding flush operation.

Rendering Pipeline Overview

Figure 2:
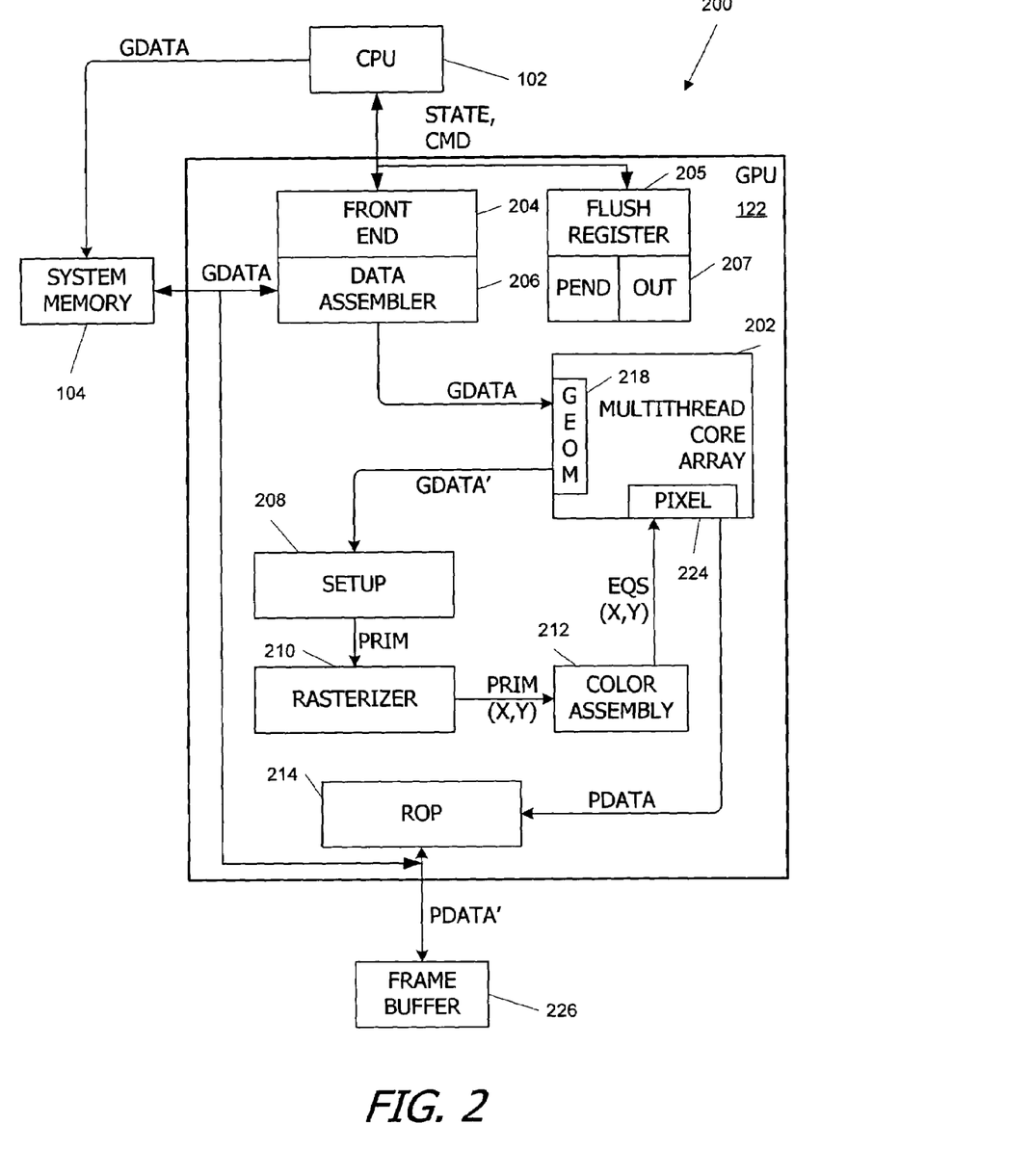
FIG. 2 is a simplified functional block diagram of a rendering pipeline.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a vertex shader program to interpolate a value for the attribute at any location within the primitive; conventional techniques can be used to generate the equations. For instance, in one embodiment, color assembly module 212 generates coefficients A, B, and C for a plane equation of the form $U=Ax+By+C$ for each attribute U.

Color assembly module 212 provides the attribute equations (EQS, which may include e.g., the plane-equation coefficients A, B and C) for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

The GPU 122 includes a flush register 205 coupled to the CPU 102. The CPU 102, executing one or more software processes, can initiate a flush operation on behalf of a particular software operation. The CPU 102 writes to the flush register 205. The GPU 122 sets the pending bit or filed of the status register 207.

The software, via the CPU 102, can poll or otherwise monitor the state of the pending bit in the status register 207 to determine the status of the flush operation. The GPU 122 clears the pending bit to indicate completion of all the flush operations, including the flush operations indicated by the outstanding status bit.

The GPU 122 can initiate a read of each memory portion in response to the flush. The memory read operations ensure that all writes to the memory locations have completed. The GPU 122 need not read all memory locations individually, but may only issue one read operation to each memory portion identified in a logical memory map. In some embodiments, the graphical memory may be partitioned into a predetermined number of partitions, and the GPU 122 may issue a read to a location within each of the memory partitions.

For example, the GPU 122 can issue a read operation to each portion of the system memory 104 identified in a logical memory map and can issue a read to each partition in local graphics memory, such as the frame buffer 226. The GPU 122 can also issue a read operation to each peer GPU (not shown).

If the GPU 122 receives any writes to the flush register during the time that the pending bit is valid, the GPU 122 sets the outstanding bit in the status register 207. If the outstanding bit is already set, due to prior a flush operation initiated during the pendency of a flush operation, the outstanding bit remains set and the later received outstanding flush operation is collapsed into the present outstanding flush operation.

When the GPU 122 completes a flush operation, it determines whether another flush is outstanding. If so, the GPU 122 clears the outstanding bit and initiates another flush operation. The GPU 122 does not clear the pending bit, because it has promoted the outstanding flush to a pending flush and is now performing the read operations for the newly pending flush.

The GPU 122 can perform the flush operation initiated by the outstanding flush in a time that is much less than the time needed to perform the initial flush operation. This is because the initial flush operation established coherency of the memory and the subsequent flush only needs to establish coherency for those portions of memory that have been written to since the issuance of the earlier flush. Because the subsequent flush operations issued during the pendency of the initial flush operation, there are likely few such writes.

The system is able to handle flush operations initiated by multiple independent processes without the need to establish an interlock of the flush register during the pendency of the first flush operation. Additionally, the GPU 122 treats additional writes to the flush register that occur during the pendency of a flush operation to be substantially idempotent initiation of the outstanding flush.

Figure 3:
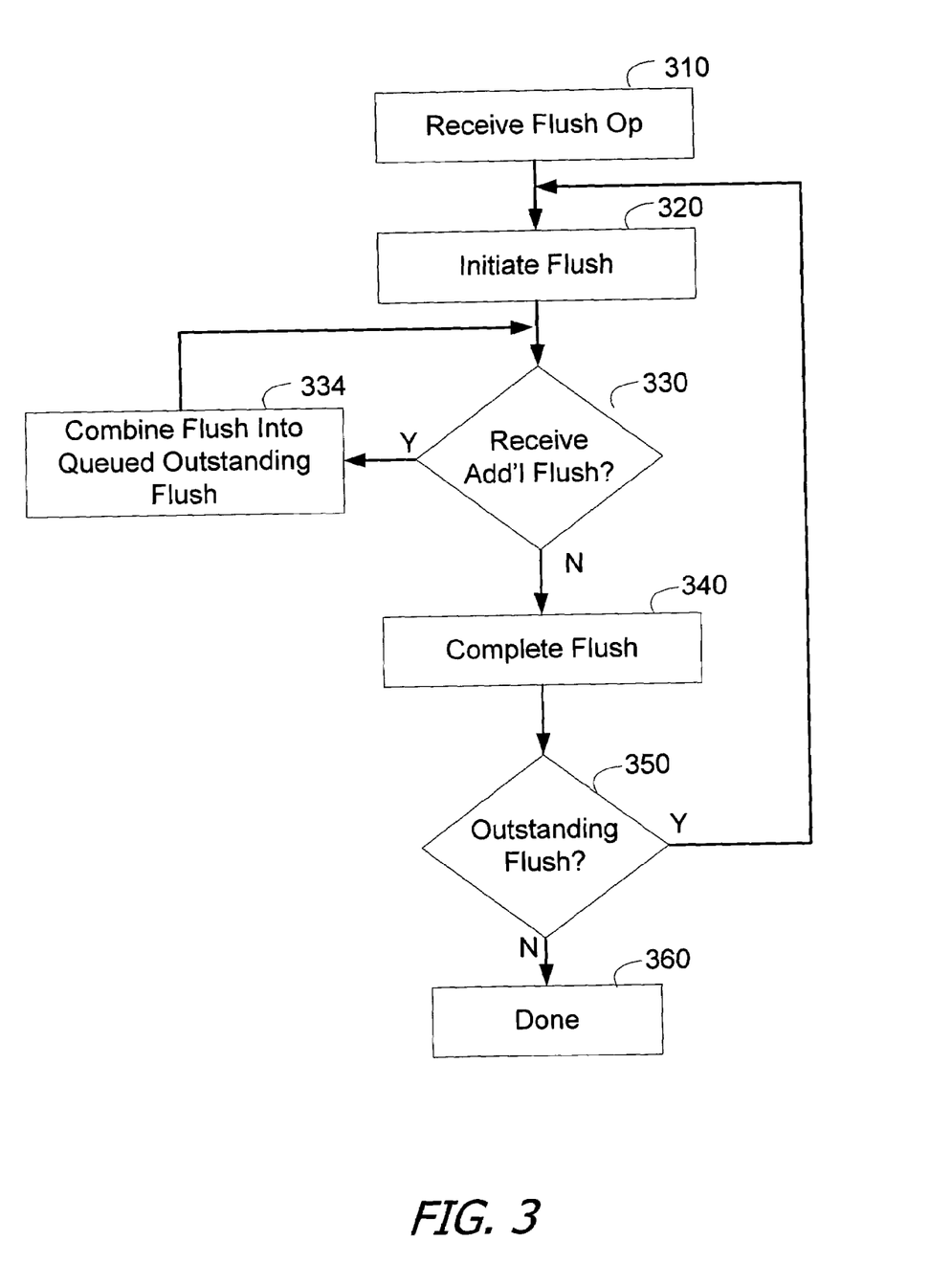
FIG. 3 is a simplified flowchart of an embodiment of a method of providing data coherency.

FIG. 3 is a simplified flowchart of an embodiment of a method 300 of providing data coherency by issuing flush operations. The method 300 can be performed, for example, by a GPU of the system shown in FIG. 1.

The method begins 300 at block 310 when the GPU receives an instruction to initiate a flush operation. The GPU can, for example, receive an explicit instruction, or can receive a write to a predetermined flush operation register.

The GPU proceeds to block 320 and initiates the flush operation. The GPU can, for example, set a status filed in a status register to indicate the processing of a flush. Additionally, the GPU can initiate one or more operations consistent with the flush operation. The operations can include purging buffers and cache contents, clearing instruction pipelines, and completing pending write operations.

During the time that the GPU is processing the flush, or awaiting acknowledgement of one or more of the operations that form part of the flush, the GPU can proceed to decision block 330 to determine if any additional requests for flush operations have been received during the processing of the present flush.

If so, the GPU proceeds to block 334 to combine the new flush request into a queued outstanding flush. If there are no other outstanding flushes that are queued, the GPU generates an outstanding flush. The GPU returns from block 334 back to decision block 330 to continue processing of the present flush and to monitor for any additional flush requests.

Returning to decision block 330, if the GPU determines that no additional flush requests have been received, the GPU completes the flush operation. The GPU proceeds to decision block 350 to determine if there are any outstanding flush operations that are queued.

If so, the GPU proceeds back to block 320 to initiate another flush operation. If, at decision block 350 the GPU determines that there are no outstanding flushes queued, the GPU proceeds to block 360 and is done.

Figure 4:
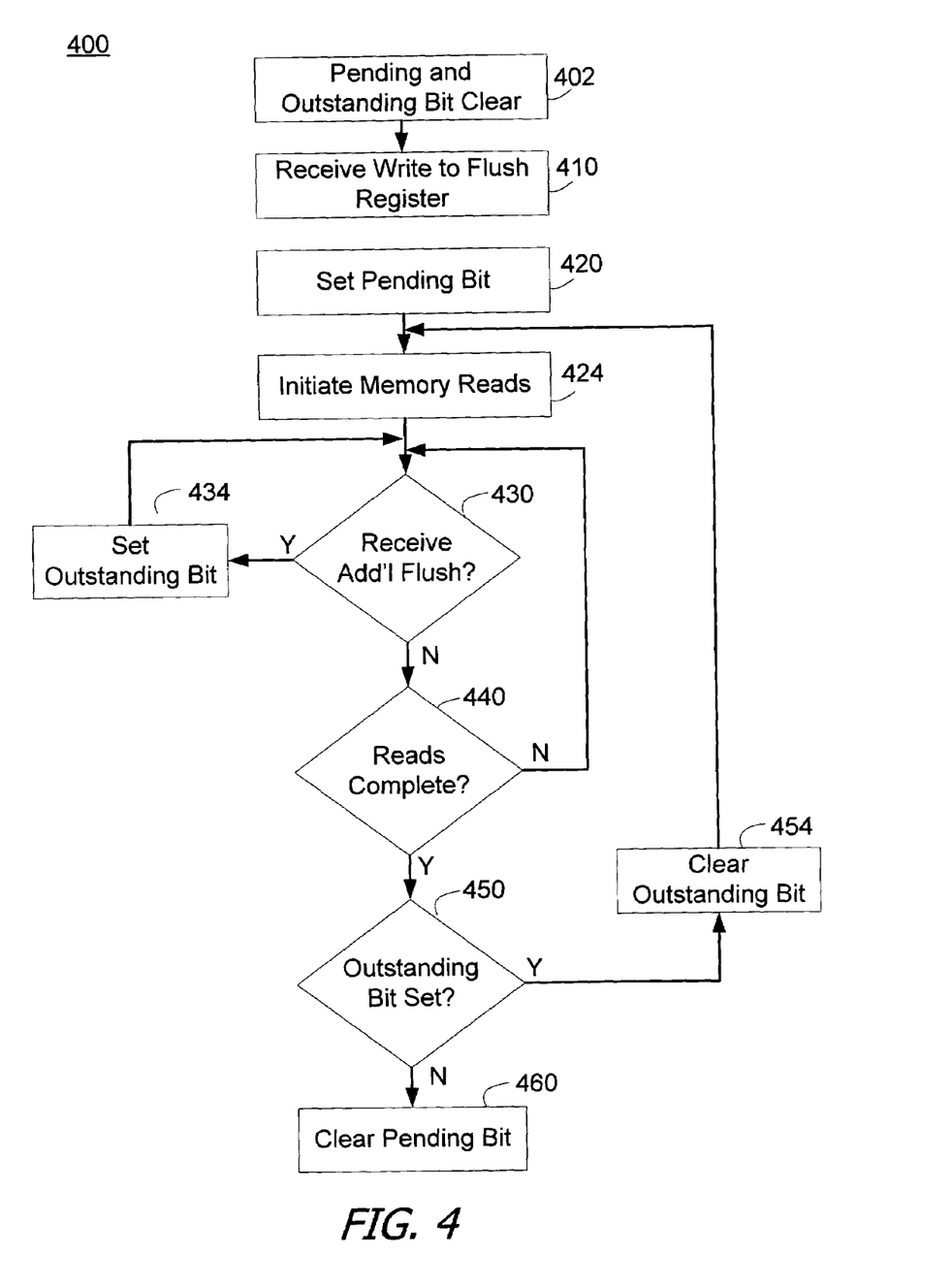
FIG. 4 is a simplified flowchart of an embodiment of a method of flushing memory for multiple producers.

FIG. 4 is a simplified flowchart of an embodiment of a method 400 of flushing memory for multiple producers. The method 400 can be performed by the GPU of FIG. 2 having the flush register and status registers.

The method 400 begins at block 402 where the pending and outstanding status bits are cleared. Having both pending and outstanding bits cleared indicates that no flush operation is presently being processed.

The GPU proceeds to block 410 and receives a write to the flush register. The write indicates an agent, such as a software process executing on the CPU, is requesting a flush operation. The GPU proceeds to block 420 and sets the pending bit of the status register to indicate the flush operation is pending.

The GPU proceeds to block 424 and services the flush request by initiating memory reads from all distinct portions of memory. That is, the GPU initiates a memory read from each distinct partition and distinct memory type that may be used by the software process. For example, the GPU may issue read instructions to at least one location from each of the memory partitions in graphics memory, and can selectively issue read instructions to at least one memory location from each of system memory and peer graphics memory.

The GPU proceeds to decision block 430 to determine if any additional writes to the flush register have been received. The GPU may periodically poll the flush register. in another embodiment, a write to the flush register can cause an interrupt to the GPU that the GPU can service. In the latter embodiment, the GPU need not explicitly monitor the flush register for writes.

If an additional write to the flush register is determined, the GPU proceeds from decision block 430 to block 434 and sets the outstanding bit in the status register to indicate that at least one flush request has been received during the pendency of a flush operation. The GPU returns from block 434 to block 430 to continue monitoring the flush register and continue processing the present flush operation.

If, at decision block 430, the GPU determines that a write to the flush register has not been received, or that all writes to the flush register have been accounted for, the GPU proceeds to decision block 440 to determine if all reads have completed. If not, the GPU returns to decision block 430 to continue to monitor the flush register and the completion of the read instructions.

If, at decision block 440, the GPU determines that all read instructions that it has issued to the various memory locations have completed, the GPU proceeds to decision block 450 to determine if the outstanding status bit has been set. Recall that the outstanding status bit indicates that at least one additional process has initiated a flush operation during the pendency of the present flush operation.

If the outstanding bit is set, the GPU proceeds to block 453 and clears the outstanding bit. The GPU then returns to block 424 to again initiate read operations to process the outstanding flush operation.

If, at decision block 450, the GPU determines that all reads have completed and there are no outstanding flush operations queued, the GPU proceeds to block 460 and clears the pending bit to indicate the completion of the pending flush operations and nay outstanding flush operations.

A flush mechanism is described that is capable of supporting multiple producers of flush requests without the need to resort to interlocking of the flush register or storing individual flush requests for serial operation. The flush operations corresponding to the multiple producers can be typically completed in less time than is required to perform two distinct flush operations.

Subsequent flush operations issued during the pendency of a flush operation can be collapsed into a single outstanding flush operation that can issue immediately upon the completion of the pending flush. Once the outstanding flush operation has completed, all of the data is coherent from all points of reference.

The various illustrative logical blocks, modules, and circuits described in connection with the embodiments disclosed herein may be implemented or performed with a general purpose processor, a graphics processing unit, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of processing multiple independent flush requests from independent processes using shared memory, the method comprising:
    receiving a first memory flush request;
    setting a pending status identifier;
    initiating a first flush operation by initiating a memory read request;
    receiving a plurality of additional memory flush requests during the pendency of the first memory flush request;
    combining the plurality of additional memory flush requests into a single outstanding flush request by determining a logical OR of fields of a flush register corresponding to each of the plurality of additional memory flush requests;
    completing the first flush operation upon receiving a value returned from the memory read request; and
    initiating an outstanding flush operation corresponding to the single outstanding flush request.

2. The method of claim 1, wherein receiving the first memory flush request comprises receiving a write to a flush register.

3. The method of claim 1, wherein setting the pending status identifier comprises setting a pending field in a status register with a predetermined value.

4. The method of claim 1, wherein initiating the first flush operation comprises initiating a read from at least one memory location from each of a plurality of memory devices.

5. The method of claim 1, wherein receiving the plurality of additional memory flush requests comprises receiving a plurality of write operations to a flush register.

6. The method of claim 1, wherein combining the plurality of additional memory flush requests comprises setting a substantially idempotent outstanding flush bit corresponding to the plurality of additional memory flush requests.

7. The method of claim 6, further comprising clearing the outstanding flush bit upon completion of the first flush operation.

8. The method of claim 1, wherein initiating the outstanding flush operation comprises initiating a read operation for at least one memory location in each memory partition written to since the receipt of the first memory flush request.

9. The method of claim 1, further comprising clearing the pending status identifier upon completion of the outstanding flush operation.

10. A method of processing multiple independent flush requests from independent processes using shared memory, the method comprising:
    receiving a first memory flush request;
    initiating a first flush operation;
    determining receipt of additional memory flush requests during a pendency of the first flush operation;
    combining the additional memory flush requests into a single queued outstanding flush by determining a logical OR of writes to a flush register received during a pendency of the first flush operation;
    completing the first flush operation in response to receiving a value returned from a read operation from memory;
    initiating a second flush operation in response to the single queued outstanding flush; and
    indicating a flush operation completion upon completion of the second flush operation.

11. The method of claim 10, further comprising setting a pending status bit in response to the first memory flush request.

12. The method of claim 10, further comprising setting an outstanding status bit if at least one additional memory flush request is received during the pendency of the first flush operation.

13. The method of claim 12, further comprising clearing the outstanding status bit upon completion of the first flush operation.

14. A system for ensuring data coherency in the presence of multiple independent processes, the system comprising:
    a flush register configured to receive a first flush request from a first of the multiple independent processes and a plurality of additional flush requests from at least one additional process from the independent processes; and a processor configured to initiate a first flush operation in response to the first flush request by initiating a read operation to a memory portion that is made coherent by the first flush operation and determine a completion of the first flush operation in response to receiving a value returned from the read operation, and further configured to combine the plurality of additional flush requests into an outstanding flush request if the plurality of additional flush requests are received during a pendency of the first flush operation, the processor combining the plurality of additional flush requests by determining a logical OR of writes to the flush register received during a pendency of the first flush request.

15. The system of claim 14, further comprising:
a status register having a pending status field and an outstanding status field; and
wherein the processor is configured to set the pending status field in response to the first flush request and sets the outstanding status field as a substantially idempotent indicator of the plurality of additional flush request.

16. The system of claim 14, wherein the processor is configured to execute a second flush operation following completion of the first flush operation in response to the outstanding flush request.

17. The system of claim 16, wherein the processor is configured to clear a pending status field in response to completion of the second flush operation.

18. The system of claim 14, wherein the processor is configured to initiate at least one read operation from each of a plurality of memory partitions in response to the first flush request.

19. The system of claim 18, wherein the processor is further configured to initiate at least one read operation from each of the plurality of memory partitions in response to the outstanding flush request.

20. A method of processing multiple independent flush requests from independent processes using shared memory, the method comprising:
receiving a write to a field from a plurality of fields within a flush register;
setting a pending status identifier;
initiating a first flush operation of a memory partition associated with the field in the flush register by initiating a read operation from the memory partition;
receiving a second memory flush requests during a pendency of the first memory flush request by receiving a second write operations to the flush register;
setting an outstanding flush indicator;
receiving an additional memory flush request while the outstanding flush indicator is set and during pendency of the first memory flush by receiving an additional write operation to the flush register;
determining an outstanding flush request by determining a logical OR of the second write operation and the additional write operation to the flush register received during the pendency of the first flush memory request;
determining completion of the first flush operation upon receiving a value returned from the read operation; and
initiating an outstanding flush operation based on the outstanding flush request.

* * * * *